Patented Feb. 18, 1947

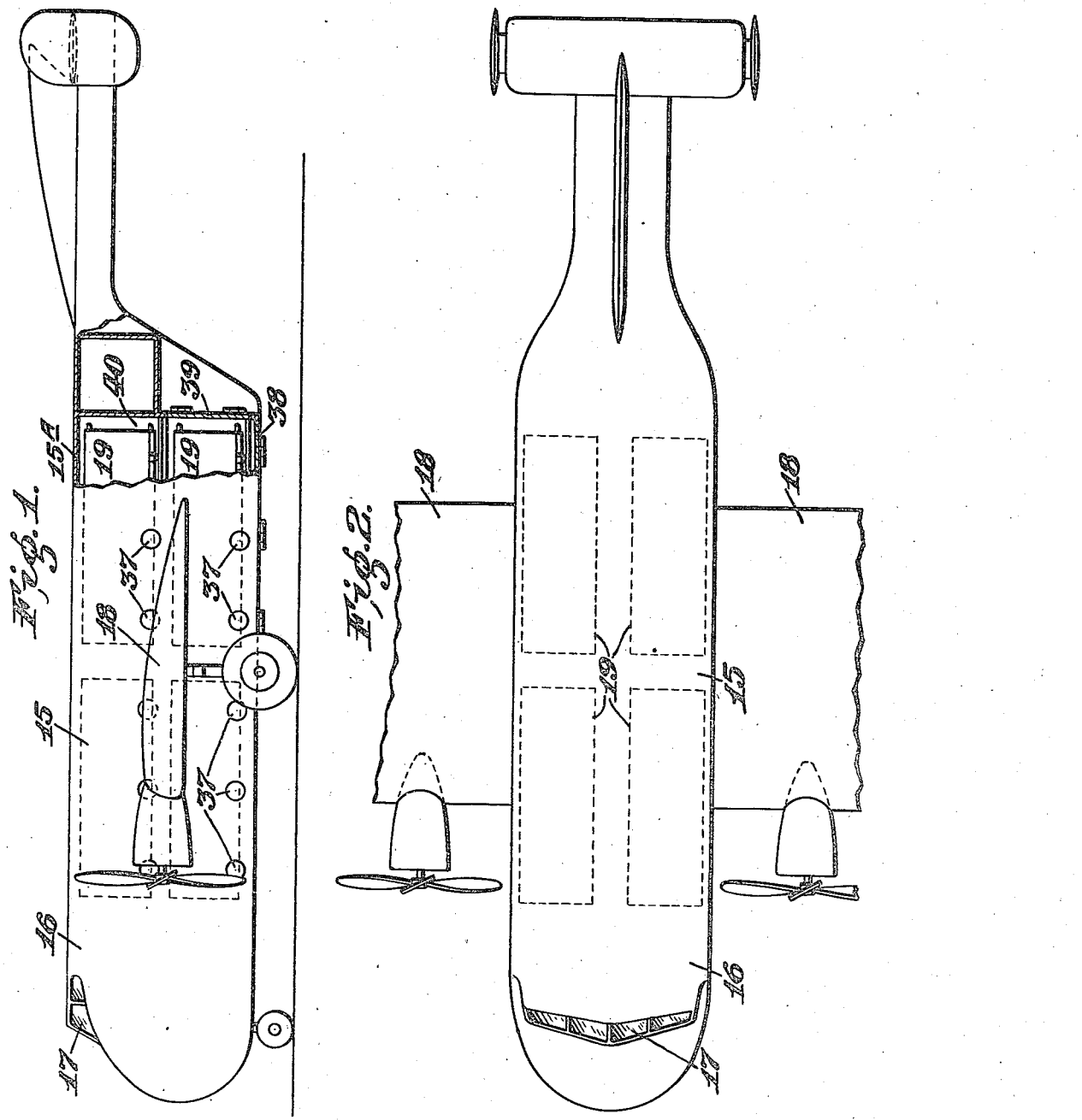

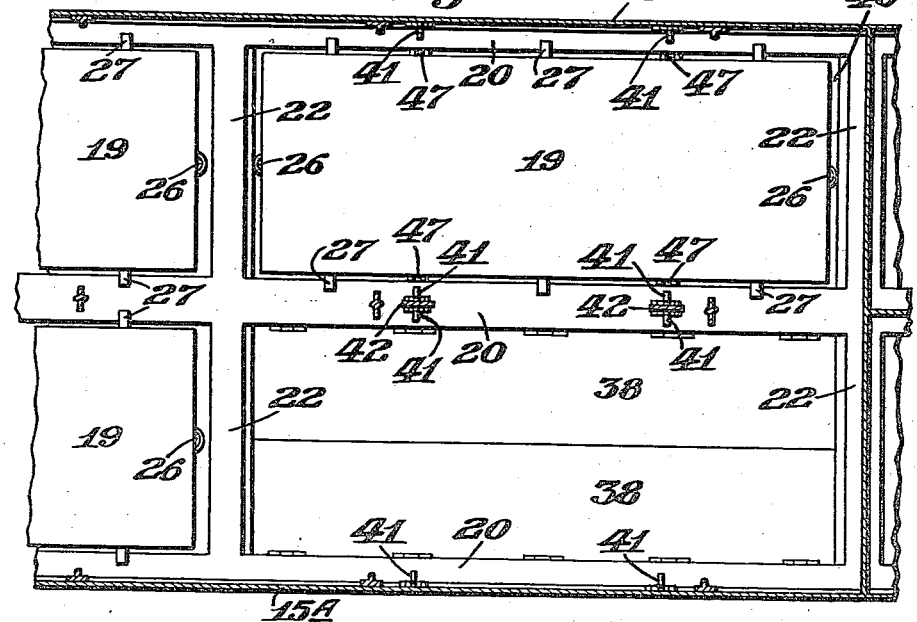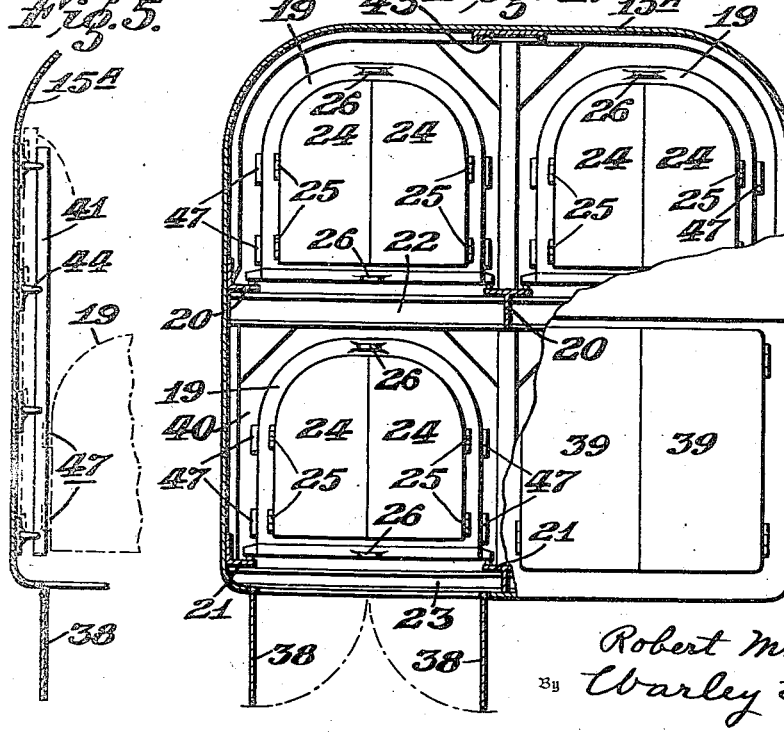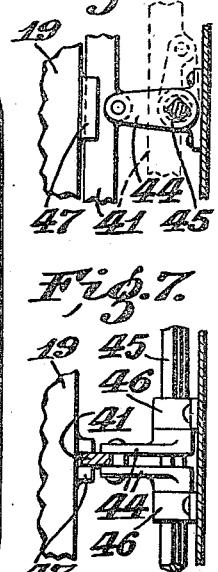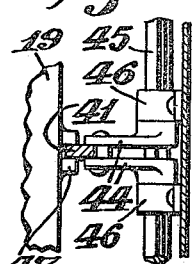

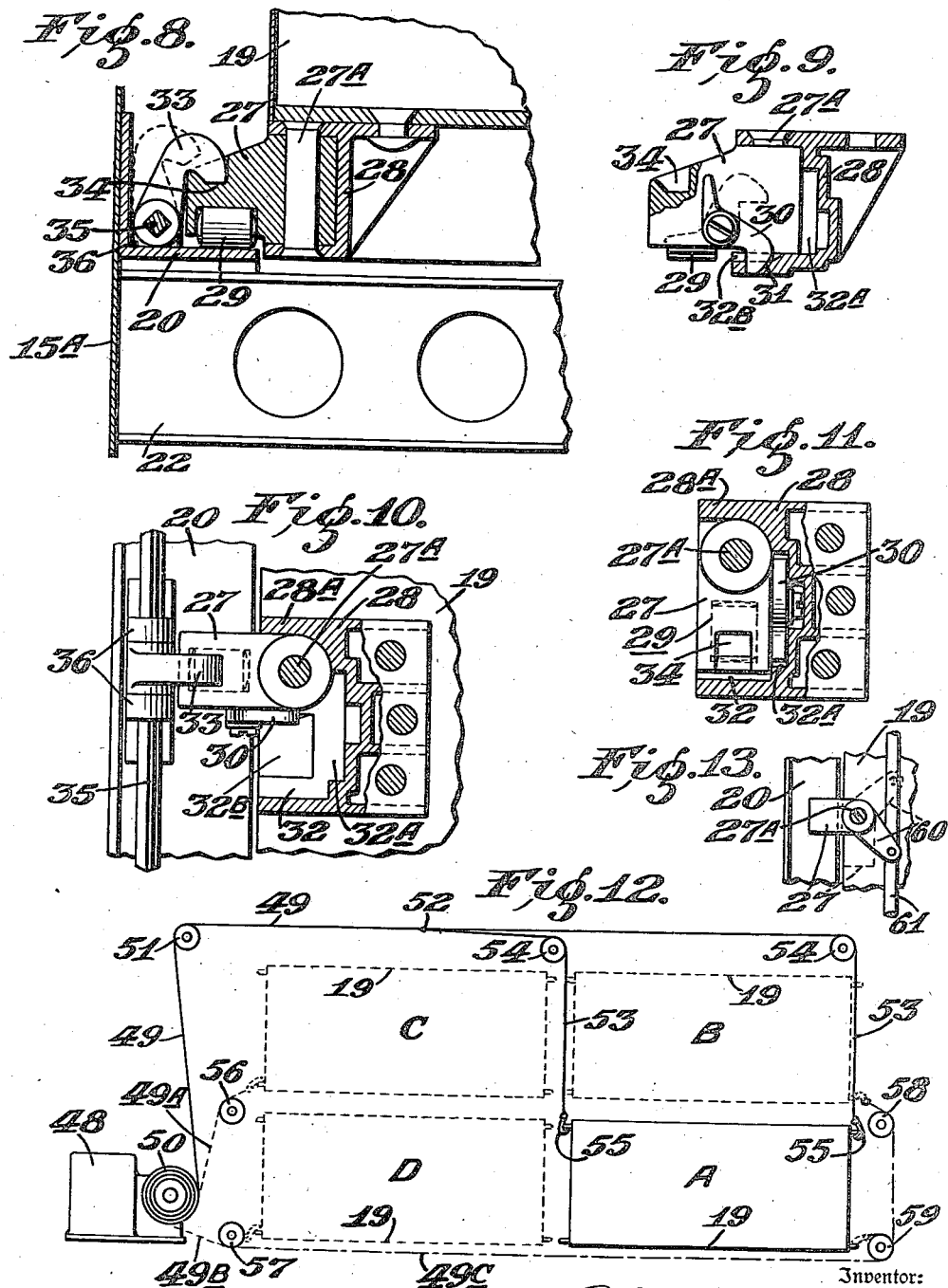

2,415,975

UNITED STATES PATENT OFFICE 2,415,975

CARGO CARRIER PLANE AND SYSTEM

Robert M. Thomson, Miami, Fla.

Application August 7, 1943, Serial No. 497,741

17 Claims. (Cl. 244—118)

This invention relates to aircraft and more particularly to improvements in freight-carrier planes.

An object of the invention is to produce a multi-car, cargo-carrier, flying machine capable of transporting very heavy loads and having provision for accommodating and handling therein a number of separate, unitary, cargo cars or portable freight containers of large proportions and storage capacity with ease, facility and safety.

A further object is to minimize cost, time and labor in loading and unloading freight-carrier planes.

A particular object is to minimize weight in structure and equipment, with ample strength and stability therein and at the same time have practical facilities in a convenient and compact arrangement for ease in placing cargo cars or portable freight container units in the fuselage of an airplane in a balanced relation, and in the removal of the same from the plane with equal facility.

Another object is to provide for conveniently loading and unloading the plane from either the bottom or an end thereof, and to attain many economical advantages in the transportation of commercial cargoes in general and the carrying of other things, as will hereinafter more fully appear.

An illustrative but non-limiting structural and systematic embodiment of the invention as to the plane itself as well as the cargo cars or freight container units and the means for loading and unloading the latter is hereinafter described in conjunction with the accompanying drawings, in which:

Fig. 1 is a side elevation and partial longitudinal section, more or less schematic in showing, of an airplane designed and provided in exemplification of a practical adaptation of the invention;

Fig. 2 is a top plan view;

Fig. 3 is a fragmentary, horizontal section on an enlarged scale, also somewhat schematic in character, but in detail more than shown in Figs. 1 and 2;

Fig. 4 is a partial vertical cross section and end view of the plane fuselage with cargo cars or freight containers placed therein;

Fig. 5 is a fragmentary vertical section and elevation, illustrative of a collapsible guide provision for use in hoisting and lowering cargo cars or freight container units in the fuselage of the plane;

Figs. 6 and 7 are fragmentary views illustrating details of the guiding provision shown in Fig. 5;

Fig. 8 is a fragmentary detail view in vertical section and partial elevation, illustrating a practical form and arrangement of retractable elements for supporting and retaining the cargo cars or freight container units in the fuselage of the plane;

Fig. 9 is a view showing further details of the retractable supporting and retaining element;

Fig. 10 is a view in top plan and partial horizontal section of the parts shown in Fig. 8;

Fig. 11 is a view illustrating the retractable supporting and retaining element in its retracted or folded-in position;

Fig. 12 is a diagrammatic view illustrating a system for hoisting, lowering and shifting the cargo cars or freight container units laterally in the plane; and, Fig. 13 is a fragmentary view illustrating a modification of the retractable supporting element.

Referring now to the drawings in detail, the numeral 15 designates generally the fuselage of the plane. Structurally, and as far as the motive and general operating and controlling equipment and other appurtenances are concerned, the same is of any approved conventional character, except as to such special features and parts that enter directly into the present invention. As shown, the pilot cabin and other controlling and navigating quarters are in the forward portion 16 of the fuselage which is provided with the usual front observation windows 17. The plane as illustrated is of the multi-motored type and it is also provided with conventional landing wheels and other regular equipment, not a direct part of or essential to the present invention, hence not shown in detail or described.

In the form and arrangement of plane as illustrated in Figs. 1 and 2, the wings 18 extend laterally from opposite sides of the fuselage and of form, size and length of spread depending, of course, on the type, particular design and capacity of the plane. As shown, the wings 18 project from a place approximately midway between the front and rear ends of the fuselage and also at a level between the top and bottom thereof. The wing location, however, will vary in accordance with the particular interior provision and arrangement of the fuselage for the accommodation of the cargo cars or freight container units therein, which cars or units may now be designated individually by the numeral 19, but will be later described more specifically.

In instances where the plane is designed to carry only one car 19 or two or more thereof in either a side-by-side or an endwise relation at one and the same level so that the fuselage frame is stressed near the bottom, the plane will be of a high wing type. But in a plane as illustrated in the drawings, wherein a multiplicity of the cars 19 are placed side by side and end to end in upper and lower tiers and the fuselage is necessarily stressed substantially midway between top and bottom, the wings are centralized longitudinally and vertically of the fuselage as first above described.

The framing of the fuselage to take care of the stresses may be of any approved form and arrangement, but the structure above the wing level is preferably of the conventional monocoque type, i. e., the outer shell or veneer sheeting 15A constituting the "skin" (as it is termed) is applied to the metal rods or extruded stiffener shapes (termed "formers") in such a way as to take much of the stresses and thus strengthen the structure and at the same time minimize the weight thereof.

In the fuselage structure for the purposes of the present invention there is no flooring, and even the bottom of the fuselage in the region where the cargo cars or freight container units 19 are placed may be left open throughout such extent thereof. Anyway, if the full opening is not desired, the said area may be covered with the skin material as used at the sides and top of the fuselage. So, too, the fuselage body below the main upper longerons and transverse spars will be amply strengthened by the depending extruded shapes of the frame members. Moreover, lighter weight skin or covering material can be used in the lower portion of the fuselage structure.

The middle and side, main, upper longerons 20 (see Figs. 3 and 4) are the stouter as they have more stresses imposed upon them than the lower middle and side longerons 21. The same is true of the upper transverse spars 22 and lower transverse spars 23. As shown, the middle longerons are T-shape in cross-section and the side longerons are of conventional L-shape. However, the same may be made of any other suitable form. This also applies to the spars.

Both the upper and lower longerons 20, 21, in addition to constituting part of the fuselage structure and serving such purpose, are used as supporting track rails for the respective cargo cars or freight container units 19. These cars of units will now be described in detail.

The units 19 are made in standard, interchangeable sizes for a given capacity. The body shell or housing portion may be made of any suitable material, e. g., either a lightweight sheet metal or plyboard or other material having the requisite characteristics to withstand the weather and the usage to which the units are subjected. The main thing is to provide an under-framing and substantial flooring in the unitary structure for strength and durability. So, too, the body housing may be suitably reinforced by frame members, and, in some cases, bulkheads may be provided to divide the unit into separate compartments as well as to serve as reinforcements in the structure, depending on the size and capacity of the unit. These details will vary in different structures and the same may be of any conventional character, hence they are not shown in the drawings.

The cargo cars or freight container units 19 are of generally rectangular form, usually oblong, and they may be flat-topped, but for uniformity and interchangeability so as to be placed in the fuselage of the plane at either the upper or lower level, at either side of the middle longeron, and to conform to the transverse curvature of a transversely arched upper portion or appreciably crowned roof of a fuselage as illustrated, the tops of the cars or units may be arched transversely as shown in Fig. 4.

For access to the interior of the cars or units 19 they may be provided with doors 24 at either or both ends or in their sides, and, in some cases, at both the sides and ends. For general use, however, end doors only need be provided, in which case the door opening may extend from top to bottom of the car or unit and be provided with a pair of the doors 24 that are hinged at their outer edges, as at 25, and meet at their inner edges centrally of the car or unit when closed (see Fig. 4). By the provision of the large single opening in the end of the car or unit 19 with the pair of doors as shown, bulky articles such as army "jeeps" or other vehicles, large pieces of equipment and other things or devices of like proportions may be placed in the cars or units.

Any suitable latching, locking and sealing means (not shown) may be provided for the closed doors. As shown, the cars or units 19 are provided at their ends with apertured lugs 26 or other suitable means for the attachment of hooks or other grappling elements on a cable or other means to hoist and lower the cars or units and for pulling them endwise into and out of position in the fuselage of the plane, or for use elsewhere in the handling thereof, as will be later more specifically described.

In the illustrated adaptation of the invention, provision is made for the accommodation of eight cargo cars or freight container units, four each at the upper and lower levels in a side-by-side and end-to-end relation. These cars or units 19 are of a width slightly less than the space between the middle and side longerons so as to be lifted and lowered vertically with ample but limited clearance between the longerons. After the cars or units 19 are elevated to a position above the lower longerons 21 or upper longerons 20, they are supported and shifted thereon. For this purpose the cars or units 19 are provided with extensible and retractable lugs 27. As shown, these lugs are hinged, as at 27A, in cast or forged bracket-housings 28 that are a part of the under-framing of the cars or units 19. In the folded-in or retracted position of the lugs 27 they are substantially flush with the sides of the cars or units (see Fig. 11) and they thus clear the longerons 20 and 21 while the cars or units are being hoisted and lowered. But, when the lugs are swung outward as shown in Figs. 8 and 9, they overhang the adjacent longerons and can rest thereon so as to afford a substantial support for the cars or units 19.

To provide for easy travel of the cars or units when supported on the longerons 20 and 21, as the case may be, the lugs 27 are equipped with antifriction bearings, which, as shown, are rollers 29 (shown more clearly in Fig. 8); and in order to lock the lugs 27 in opened position they are each provided with a latch-dog 30 which engages in an aperture 31 provided for the purpose in the bracket-housing 28 (see Fig. 9). In this position of the lug 27 it is held solidly against the adjacent wall portion 28A of the bracket-housing 28 (see Fig. 10) and thus prevented from swinging in that direction and at the same time it is held firmly against movement in the opposite direction; yet, when it is desired to fold in and retract the lug, the latch-dog 30 is readily disengaged from the aperture 31 and the lug 27 then swung back into the pocketed portion 32 of the bracket housing as shown in Fig. 11, at which time the latch-dog 30 is received in a counter-recess 32A (see Figs. 9, 10 and 11). In this folded-in position of the lug 27, the projecting portion of its roller 29 is received in a rectangular depression 32B in the pocketed portion 32 of the housing (see Figs. 9 and 10).

After the cars or units 19 are positioned at the proper place in the fuselage of the plane the several lugs 27 are projected from the cars or units in supporting position on the longerons 20 or 21, as the case may be, and then engaged by retainer elements provided for the purpose on the longerons. These retainer elements, as shown in Figs. 8 and 10, are in the form of hooked arms 33 that engage in recesses 34 formed in the top portions of the lugs 27. The hooked arms 33 are fixedly secured on common master rods 35 journalled in bearings 36 on the longerons, said rods extending the length of the fuselage.

The rods 35 may be provided with handle-levers or any other suitable operating means (not shown) which can be conveniently located in the general control cabin or compartment 16 at the forward end of the fuselage or in some other conveniently accessible place at the rear of the fuselage. This particular provision being conventional, the same is not illustrated in detail in the drawings.

Any suitable number of the extensible and retractable lugs 27 may be provided for the respective cargo cars or freight container units 19, but whatever the number may be they are in standardized uniformity on all cars or units and a corresponding number of the retainer hooks 33 are provided in proper correlation on the longerons 20 and 21 at the respective places where the cars or units 19 are to be positioned in the fuselage.

It is here noted that the retainer hooks 33, when engaged with the car or unit supporting lugs 27, as shown in Figs. 8 and 10, prevent lifting movement of the cars or units as well as lengthwise movement of the same; and, for this purpose, the retainer hooks 33 and lugs 27 are made sufficiently strong compatible with weight minimization. Transverse shifting movement of the cars or units 19 is also resisted by the bearing 36 for the rods 35 which are in near abutting proximity to the adjacent ends of the lugs 27.

For conveniently inserting a suitable manipulator rod or other elongated implement from outside the fuselage to move the lugs 27 into either projected or retracted position, portholes 37 (see Fig. 1) are provided in the side skin portions of the fuselage. These port openings 37 may be either left uncovered or provided with suitable covers, as desired. Such manipulator rod or implement (not shown) may have any special form at the inner end thereof to effect the release of the latch-dog 30 from its engagement in the aperture 31 of the bracket-housing 28 and also for effecting the opening and closing of the retractable lug 27. Such implement can also be used conveniently inside of the fuselage.

As hereinbefore described, the fuselage may have its bottom opened throughout the full extent thereof, in which case, the cargo cars or freight container units 19 may be lifted into the fuselage through the bottom and right up to their respective locations in the fuselage. However, if the entire bottom of the fuselage is covered by the skin material, an opening may be provided only in the bottom adjacent the rear end of the fuselage, such opening, of course, being large enough for the passing of a car or unit 19 therethrough; and in which case the opening may be provided with trap-doors 38 that open downwardly as shown in Figs. 1, 3, 4 and 5. This provision is for loading the plane from a pit in the ground or from a place below when the plane may be resting on an elevated landing platform or other raised surface.

For loading the plane from a platform or a truck above ground, rear openings may be provided in the lower end wall portions of the fuselage and have outwardly opening doors 39 (see Figs. 1 and 4). But in either the bottom or end loading and unloading provision the loading and unloading of the fuselage is done at the lower level of the plane and the car or unit 19 as thus taken in is either shifted forwardly to its position in the fuselage or drawn rearwardly therefrom, as the case may be, or else lifted to or lowered from the upper level in the adjacent end space 40 which may be hereinafter termed the "well space" of the fuselage for future identification. In this latter case the car or unit 19 is either shifted to or from a forward position at the upper level or else held supported on the longerons at the upper level in the same position where lifted in the well space.

To guide the cars or units 19 in the hoisting and lowering thereof, collapsible, vertical, guide rails 41 (see Figs. 5, 6 and 7) are provided on the side walls of the fuselage and also on vertical frame members 42 (see Fig. 3) extending between the upper and lower middle longerons 20, 21, and between the upper middle longeron 20 and a longitudinal roof supporting, marginally extruded frame member 43 (shown in Fig. 4). These collapsible guide rails 41 are mounted on vertically swingable, hinged arms 44 (see Figs. 6 and 7) that are fixed on common master rods 45 journalled in supporting bearing members 46. These rods, like the aforesaid rods 35 that carry the retainer hooks 33, may be operated by means (not shown) provided either in the forward control cabin or compartment 16 of the fuselage or else located conveniently at the rear end portion of the fuselage.

Normally, the guide rails 41 are held in retracted position, as shown by dotted lines in Figs. 5 and 6, but they are movable into the projected working position shown in full lines, at which time they enter vertical grooves in guide blocks 47 provided on the opposite side walls of the cars or units 19. When the guide rails 41 and guide blocks 47 are thus engaged and the supporting lugs 27 are retracted, the cars or units 19 can be raised and lowered, and in such movement they are guided effectively. The blocks 47, of course, clear the longerons 20, 21.

Any suitable system for hoisting, lowering and shifting the cars or units in the fuselage may be provided. A conventional system is shown diagrammatically in Fig. 12. In this exemplification a conventional motor-powered winding device 48 is indicated, and the same may be located either in the forward control cabin or compartment 16 of the fuselage or elsewhere, as may be desired or most convenient. So, too, a manually operated device may be provided instead of the motor-powered device indicated.

For hoisting and lowering the cars or units 19, a cable 49, indicated by full lines in the diagram, is wound upon or unwound from the drum 50 of the device 48, as the case may be, said cable being carried over a supporting pulley 51 and divided from an approximate point 52 into two branches 53 which are respectively carried over a pair of supporting pulleys 54. The cable branches 53 are provided at their ends with hooks or other suitable grapples 55 that are engageable with the upper lugs 26 at the ends of the car or unit 19 which is to be hoisted or lowered. For example, with the cable branches 53 attached to the car or unit 19 in the lower position A where the car or unit is shown in full lines in the diagram, the hoisting device 48 can be operated to wind the cable 49 on the drum 50, thereby lifting the car or unit 19 from position A to the position B as indicated in dotted lines, in which position the car or unit 19 may be let remain and its retractable lugs 27 opened out to support the car or unit on the adjacent longerons 20 as hereinbefore described. By the same provision but with an unwinding operation of the hoisting device 48, the car or unit 19, if its supporting lugs 27 be retracted as hereinbefore described, is lowered from position B down to position A or still further downward and passed out through the bottom opening of the fuselage. By the same hoisting provision, of course, the cars or units 19 are lifted into the fuselage of the plane through the bottom opening.

The same hoisting device 48 and cable 49 is used to move the cars or units forwardly in the fuselage to either the position C or the position D as indicated in the diagram, as the case may be, and also from position C back to position B or from position D back to position A. For example, to move the car or unit from position B to position C, the hook or grapple 55 on one of the cable branches 53 is engaged with the lower, forward end lug 26 of the car or unit in position B, the cable 49 and its branches 53 having been removed from the pulleys 51, 54 and transferred to a lower supporting pulley 56 as shown by dotted lines 49A. The winding of the cable 49 on the drum 50 of the hoisting device 48 thus pulls the car or unit to position C. In the same way, the car or unit is pulled from position A to position D by transferring the cable to pass under a still lower pulley 57 as also indicated by dotted lines 49B in the diagram.

To pull the car or unit from position C back to position B the cable 49 is carried over a rear upper pulley 58 and under a lower pulley 59, thence under the aforesaid lowermost forward pulley 57 to the winding device as indicated by the dot and dash line 49C. The car or unit is also pulled from position D back to position A in the same manner, except that the upper pulley 58 is not used, but the cable is looped over and under the lower pulley 59 only and thence carried to the forward pulley 57.

The foregoing described hoisting, lowering and pulling system for the cars or units 19 is more or less conventional as to the specific details of its particular elements and it is so illustrated in the drawings, but the general broad combination and function of the system as a whole is of the essence of the invention and so claimed. Such system is equally applicable and efficient in the handling of the cars or units 19 in the fuselage whether they be taken in or removed from the plane through the bottom door openings 38 or the door openings 39 in the rear end wall portions of the fuselage.

It is here noted that while the cargo cars or freight container units 19 are shown in the drawings without any running gear including wheels, springs, etc., it is within contemplation and purview of the invention to equip such conventional cars with the supporting lugs 27 or their equivalent so that cars either with or without wheels can be carried in the fuselage of the plane in substantially the same way in which the illustrated cars or units 19 are handled and placed. Moreover, it is possible to design and use the lugs 27 as supporting legs, either with or without rollers or wheels, when the car or units 19 are loaded into the plane or when they are being handled while removed and away from the plane.

It is further pointed out that the cars or freight container units 19 may be equipped with a parachute provision substantially as set forth in my prior Patent No. 2,077,910, dated April 20, 1937. With such provision and associated releasing means the cars or units 19 can be dropped from the plane in an emergency or should it be desired to intentionally discharge them from a high altitude while the plane is in flight.

For a quick and simultaneous retraction of all of the supporting lugs 27 to discharge a car or unit 19 through the bottom opening of the fuselage, in the instances just above stated, said lugs 27 may be provided each with a lever arm 60 and the series of arms connected by a common pull- and-push rod 61 (see Fig. 13). In this modification the latch-dogs 30 may be eliminated, inasmuch as the rod 61 which extends the full length of the car or unit 19, will have at one of its ends at least, some kind of operating lever or device (not shown) by which it is held as well as operated. In this way the several lugs 27 will be held in both opened and closed position and thus obviate the necessity for providing said latch-dogs 30.

By the multi-car system of the present invention and the pre-loading of the individual cargo cars or freight container units 19 at the factor, warehouse or airport, the transporting plane is not detained for the heretofore long length of time consumed in the ordinary loading operations, and the unloading of the plane is also accomplished just as speedily. Moreover, the cargo need not be equalized within each individual car or container unit 19, nor does the center of gravity of the load have to coincide exactly with the center of the car or unit. Some cars or units will be loaded with the heavier portion of the cargo either fore or aft of the middle of the car or unit, say 25% forward or aft, as the case may be, and 75% towards the opposite end, or in other proportions. The cars or units being interchangeable and reversible in placing them in the fuselage of the plane, and, in practice, each marked to indicate the balanced state of the load (equal or unequal, as the case may be) as well as the gross weight thereof, the several cars or units are placed accordingly in the fuselage in a readily determined and properly balanced relation as to the plane itself. In accordance with the system of the present invention the center of gravity of the respective cars or units 19 is a flexible factor; hence, there is no undue tie-up of the plane as might be caused by time that would otherwise be consumed in computing the centers of gravity of the several cars or units. To obviate this necessity, prepared tables of various gross weight and proportional relative balances will be used for guidance in the loading of the cars or units on the plane. Anyway, as above stated, loading and unloading time is greatly minimized in comparison to the time usually consumed in placing individual pieces of freight of various sizes and weights separately in the fuselage and also in the unloading of the same.

With the system of the present invention the operator of the plane, in advance of its arrival, radios or otherwise sends notice of the load percentages that can be picked up and accommodated. So, too, the airport or other place of loading can advise the operator of the plane as to what is to be taken on board there. In either case the load is readily adjusted accordingly.

While the illustrated structural provisions and arrangements constitute a practical embodiment and adaptation, the invention is not limited specifically thereto, as considerable variation is contemplated and permissible within the spirit and scope of the appended claims.

I claim:

1. A cargo transport airplane comprising a fuselage, the lower portion of which has a trussed frame structure including laterally spaced apart main longerons located approximately midway between top and bottom of the fuselage and vertically alined, similarly spaced longerons at the bottom of the fuselage, the portion of the fuselage structure above the upper longerons being of monocoque form, the longerons, in correlated horizontal pairs thereof, in addition to their regular structural function serving as supporting track rails for carrying and supporting directly thereon a number of individual cargo cars or freight container units of standardized size and form for interchangeability and at upper and lower levels within the fuselage, the respective cars or container units being each of a width slightly less than the distance between the inwardmost parts of a correlated pair of the spaced apart longerons so as to be lifted and lowered in such space with limited clearance from the longerons, each car or container unit having extensible and retractable supporting lugs on opposite sides thereof, such lugs, when retracted, clearing the longerons during lifting and lowering of the car or container unit therebetween, but in projected position said lugs will extend over and rest upon the adjacent longerons so as to support the car or unit, the fuselage having an opening in its lower portion and adjacent one end thereof for taking the cars or container units into and removing them from the fuselage, hoisting, lowering and pulling means within the fuselage for taking in and removing the cars or container units, for transferring them between lower and upper levels and for shifting them forwardly and rearwardly at either level, and means for releasably locking the supporting lugs of the cars or units on the longerons to hold in place the cars or units as positioned for transport in the fuselage.

2. In cargo-carrying aircraft, a fuselage enclosure shell having in its body framing laterally spaced apart main longerons on which cargo cars or freight container units are carried directly and supported within the fuselage for transportation, the said cars or units being each of a width to be passed vertically between correlated pairs of the spaced apart longerons and having, on opposite sides, extensible and retractable lugs which, in retracted position, clear the longerons during lifting and lowering of the car or unit in the space between the longerons but in projected position said lugs will extend over and rest upon the longerons so as to support the car or unit thereon, means on the car or unit for releasably locking said lugs in projected position, and means on the longerons for releasable interlocking engagement with the lugs as supported thereon whereby to hold the car or units against lifting and also from endwise and sidewise movement when positioned in the fuselage for transport.

3. In cargo-carrying aircraft, a fuselage enclosure shell having in its body framing laterally spaced apart main longerons on which cargo cars or freight container units are carried directly and supported within the fuselage for transportation, the said cars or units being each of a width to be passed vertically between correlated pairs of the spaced apart longerons and having, on opposite sides, extensible and retractable lugs which, in retracted position, clear the longerons during lifting and lowering of the car or unit in the space between the longerons but in projected position said lugs will extend over and rest upon the longerons so as to support the car or unit thereon, said lugs being hingedly mounted to swing about vertical axes in bracket housings on the car or unit and folded into said housings in retracted position, means for releasably locking said lugs in projected opened position on the housings, and means on the longerons for releasable interlocking engagement with the projected lugs as supported thereon whereby to hold the car or unit against lifting and also from endwise and sidewise movement when positioned in the fuselage for transport.

4. In cargo-carrying aircraft, a fuselage enclosure shell having in its body framing laterally spaced apart main longerons on which cargo cars or freight container units are carried directly and supported within the fuselage for transportation, the said cars or units being each of a width to be passed vertically between correlated pairs of the spaced apart longerons and having, on opposite sides, extensible and retractable lugs which, in retracted position, clear the longerons during lifting and lowering of the car or unit in the space between the longerons but in projected position said lugs will extend over and rest upon the longerons so as to support the car or unit thereon, said lugs being hingedly mounted to swing about vertical axes in bracket housings on the car or unit and folded into said housings in retracted position, releasable latch members on said lugs for engaging the bracket housings to hold the lugs in projected open position, said lugs having recesses in the tops of their projected portions, and means on the longerons including hooked latch members for releasable interlock-engagement in the recessed portions of said lugs whereby to secure the lugs and prevent lifting, endwise and sidewise movement of the cars or units when the same are positioned in the fuselage for transport.

5. In transportation by aircraft embodying accommodating standardization of fuselage structure and arrangement for the reception and carrying of individual cargo cars or container units standardized in size and form for interchangeability and use in multiples thereof, the fuselage having in its body framing laterally spaced apart horizontal supporting members in correlated pairs, the cargo cars or container units being of a width to pass vertically between and with limited clearance from said supporting members, means for effecting releasable interengagement between said supporting members and the respective cargo cars or container units for supporting directly on the supporting members each individual car or unit as positioned in the fuselage for transportation. vertical guide elements on opposite sides of each cargo car or container unit, opposed, laterally extensible and retractable, vertical guide members on the fuselage body framing for slidable engagement between the same and said guide elements on the respective cargo cars or container units for guiding said cars or units in vertical movement between said horizontal supporting members of the fuselage body framing, and means for moving said vertical guide members on the framing into and out of guiding engagement with said guide elements on the cargo cars on container units.

6. In transportation by aircraft embodying accommodating standardization of fuselage structure and arrangement for the reception and carrying of individual cargo cars or container units standardized in size and form for interchangeability and use in multiples thereof, the fuselage having in its body framing laterally spaced apart horizontal supporting members in correlated pairs, the cargo cars or container units being of a width to pass vertically between and with limited clearance from said supporting members, means for effecting releasable interengagement between said supporting members and the respective cargo cars or container units for supporting directly on the supporting members each individual car or unit as positioned in the fuselage for transportation, said means when effecting such interengagement holding the positioned car or unit from vertical, endwise and sidewise movement, vertical guide elements on opposite sides of each cargo car or container unit, opposed, laterally extensible and retractable, vertical guide members on the fuselage body framing for slidable engagement between the same and said guide elements on the respective cargo cars or container units for guiding said cars or units in vertical movement between said horizontal supporting members of the fuselage body framing, and means for moving said vertical guide members on the framing into and out of guiding engagement with said guide elements on the cargo cars or container units.

7. A cargo carrier plane having a fuselage frame structure including longerons in laterally spaced parallel horizontal relation and between which unitary cargo containers are passable both vertically and longitudinally, said longerons providing in themselves supporting rails for the containers, said containers having laterally extensible and retractable lugs to be projected over and rest upon the adjacent longerons to support the container in the fuselage, and means for releasably locking said lugs in projected position and from movement on the longerons.

8. An aircraft having a fuselage for transporting standardized and interchangeable, individual cargo cars or freight container units, said fuselage being of a stressed monocoque structure in its upper portion but its lower portion comprising a truss framework, said fuselage being without any substantial flooring but having laterally, spaced apart, parallel main longerons in its lower frame which, in addition to regular structural function, constitute supporting track rails for carrying and supporting directly thereon the cargo cars or freight container units, the respective cars or units each being of a width slightly less than the distance between the inwardmost parts of a correlated pair of the spaced apart longerons, whereby a car or unit can be lifted and lowered through such space with limited clearance from the longerons, said cars or units being provided with laterally extensible and retractable members at their opposite sides, said members when retracted clearing said longerons during lifting and lowering of the cars and units but in projected position extending over and resting upon the adjacent longerons when the car or unit is positioned in place at a given level in the fuselage of the plane, means for releasably engaging and holding said members on said longerons, and means for hoisting, lowering and shifting the cars or units forwardly and rearwardly to and from position in the fuselage.

9. A cargo transport airplane adapted for carrying at one time a number of individual cars or freight container units of standardized size and form for interchangeability, comprising a fuselage having an opening in its lower portion for loading and unloading said cars or units and including main longerons spaced laterally apart in parallel paired relation, said longerons, in addition to their regular structural function, serving as supporting track rails for carrying and supporting directly thereon the cargo cars or freight container units, the respective cars or units each being of a width slightly less than the distance between the inwardmost parts of a correlated pair of the spaced apart longerons so as to be lifted and lowered in such space with limited clearance from the longerons, and means for releasably supporting said cars or units upon said longerons and also releasably holding the cars or units from movement while still supported, said means comprising laterally extensible and retractable members provided on opposite sides of each car or container unit, such members when retracted clearing the longerons during lifting or lowering of the car or unit but in projected position extending over and resting upon the adjacent longerons so as to support the car or unit, and retainer members mounted cooperatively on the longerons for releasable interlocking engagement with said extensible and retractable members of the supported car or container unit.

10. In a system for airway transport of cargoes in which individual cargo cars or freight containers are standardized in size and form for interchangeability and use in multiples thereof, the provision for use therewith of a special transport airplane having a fuselage enclosure shell for accommodating therein at one time a multiplicity of the cars or units, the fuselage of the plane including main longerons and being arranged without any flooring in the cargo carrying region thereof, and said main longerons, in addition to the regular structural function, being spaced laterally a definite distance apart in parallel horizontal relation and serving in correlated pairs as supporting track rails for carrying and supporting directly thereon the said cargo cars or freight container units, the respective cars or units each being of a width to pass between correlated pairs of the fuselage longerons and having extensible and retractable elements at their opposite sides which when retracted clear the longerons during raising and lowering of the car or container unit but in projected position extend over and rest over the longerons so as to support the cargo car or freight container unit thereon, and releasable means on the longerons for engaging said element as positioned thereon so as to hold each cargo car or freight container unit against lifting and also from endwise and sidewise shifting movement when positioned in the fuselage.

11. A cargo transport airplane comprising a fuselage the lower portion of which has a truss frame structure including laterally spaced apart main longerons located approximately midway between top and bottom of the fuselage, and vertically aligned, similarly spaced longerons at the bottom of the fuselage, the portion of the fuselage structure above the upper longerons being of monocoque form, the longerons, in addition to their regular structural function, serving as supporting track rails for carrying and supporting directly thereon, a number of individual car or container units of standardized size and form for interchangeability, the respective car or container units each being of a width slightly less than the distance between the inwardmost parts of a correlated pair of spaced apart longerons so as to be lifted and lowered in such space with limited clearance from the longerons, extensible means associated with said container units projectable to rest upon adjacent longerons to support the containers in the fuselage, and means for releasably locking said extensible means in projected position to secure each car or container unit to said fuselage.

12. In a system for airway transportation of cargoes in which individual cargo cars or freight containers are standardized in size and form for interchangeability and use in multiples thereof, the provision for use therewith of a floorless cargo airplane comprising a fuselage the lower portion of which has a truss frame structure including laterally spaced apart main longerons located approximately midway between top and bottom of the fuselage and vertically aligned similarly spaced longerons at the bottom of the fuselage said longerons, in addition to their regular structural function, being arranged in correlated horizontal pairs and serving as supporting track rails for carrying and supporting the cargo cars or freight container units, the respective cars or units being each of a width to pass between correlated pairs of the longerons, extensible means associated with said container units projectable to rest upon adjacent longerons to support the containers in the fuselage, and means for releasably locking said extensible means in projected position to secure said cars or containers on said longerons.

13. A floorless cargo carrier plane having a fuselage frame structure including longerons in laterally spaced parallel horizontal relation and between which unitary cargo cars or freight containers are passable both vertically and longitudinally, said longerons providing in themselves supporting rails for the containers, extensible means associated with said container units projectable to rest upon adjacent longerons to support the containers in the fuselage, and means for releasably locking said extensible means in projected position to secure said cars or containers to said fuselage.

14. An airplane having a fuselage frame structure including longerons in laterally spaced parallel horizontal relation and between which unitary cargo containers are passable both vertically and longitudinally, said longerons providing in themselves supporting rails for the containers, extensible means associated with said containers projectable to rest upon adjacent longerons to support the containers in the fuselage, and means for releasably locking said extensible means in projected position and from movement on the longerons.

15. A carrier plane having a fuselage frame structure including longerons in laterally spaced parallel horizontal relation and between which unitary conveyances are passable both vertically and longitudinally, said longerons providing in themselves supporting rails for the conveyances, each conveyance having laterally extensible and retractable lugs to be projected over and rest upon the adjacent longerons to support the conveyance in the fuselage, and means for releasably locking said lugs in projected position and movement on the longerons.

16. An airplane having a fuselage frame structure including longerons in laterally spaced parallel horizontal relation and between which unitary conveyances are passable both vertically and longitudinally, said longerons providing in themselves supporting rails for the conveyances, extensible means associated with said conveyances projectably to rest upon adjacent longerons to support the conveyances in the fuselage, and means for releasably locking said extensible means in projected position and from movement on the longerons.

17. An airplane having a fuselage frame structure including longerons in laterally spaced parallel horizontal relation and between which unitary conveyances are passable both vertically and longitudinally, said longerons providing in themselves supporting rails for the conveyances, retractable means associated with said conveyances projectable to rest upon adjacent longerons to support the conveyances in the fuselage, and means for releasably locking said retractable means in projected position and from movement on the longerons.

ROBERT M. THOMSON.

REFERENCES CITED

The following references are of record in the file of this patent:

UNITED STATES PATENTS

| Number | Name | Date |
| --- | --- | --- |
| 1,625,700 | Black | Apr. 19, 1927 |
| 1,825,301 | Beisel | Sept. 29, 1931 |
| 1,860,076 | Callison | May 24, 1932 |
| 1,882,338 | Reed et al. | Oct. 11, 1932 |
| 2,075,042 | Knerr | Mar. 30, 1937 |
| 2,095,440 | Hajnowski | Oct. 12, 1937 |
| 2,268,009 | Babb | Dec. 30, 1941 |
| 2,323,279 | Van Zelm | June 29, 1943 |

FOREIGN PATENTS

| Number | Country | Date |
| --- | --- | --- |
| 527,663 | German | June 20, 1931 |
| 167,068 | British | Aug. 4, 1921 |